(12) United States Patent
Grajales

(10) Patent No.: US 12,242,558 B2
(45) Date of Patent: Mar. 4, 2025

(54) METHOD AND SYSTEM OF USING NFC TECHNOLOGY ON EYEWEAR FRAMES, EYEWEAR ACCESSORIES, AND EYE DROP CONTAINERS TO LINK USERS DEVICES WITH PRESCRIPTIONS AND INFORMATION

(71) Applicant: Willis Dennis Grajales, Little Elm, TX (US)

(72) Inventor: Willis Dennis Grajales, Little Elm, TX (US)

(73) Assignee: Willis Dennis Grajales, Little Elm, TX (US)

( * ) Notice: Subject to any disclaimer, the term of this patent is extended or adjusted under 35 U.S.C. 154(b) by 443 days.

(21) Appl. No.: 17/468,642

(22) Filed: Sep. 7, 2021

(65) Prior Publication Data
US 2022/0156339 A1     May 19, 2022

Related U.S. Application Data

(60) Provisional application No. 63/075,827, filed on Sep. 9, 2020.

(51) Int. Cl.
*G06F 16/955*     (2019.01)
*G06K 7/10*     (2006.01)
*G06K 7/14*     (2006.01)

(52) U.S. Cl.
CPC ..... *G06F 16/9554* (2019.01); *G06K 7/10297* (2013.01); *G06K 7/1417* (2013.01)

(58) Field of Classification Search
CPC .... G06F 16/9554; G06F 1/163; G06F 21/577; G06F 2221/033; G06F 3/017;
(Continued)

(56) References Cited

U.S. PATENT DOCUMENTS

| 8,628,194 B2 * | 1/2014 | Sabeta | G07C 11/00 351/159.01 |
| 9,606,376 B2 * | 3/2017 | Filutowski | G02C 11/10 |

(Continued)

OTHER PUBLICATIONS

"Experience the future of wearable technology-Philips Healthcare," Internet page printed from http://www.healthcare.philips.com/main/about/future-of-healthcare/ on May 8, 2014. (Year: 2014).*
(Continued)

*Primary Examiner* — Sheree N Brown

(57) ABSTRACT

The invention relates to an information distribution marketing ecosystem connecting eyewear, eyewear accessories, signs, stickers to present prescriptions, information or telemedicine connection capabilities based on NFC technology embedded or adapted onto products. The method and system comprising of using mobile applications to program eyeglasses or contact lenses prescriptions, weblink connection, product information, synergistic marketing, appointment scheduling links, and/or virtual audio telemedicine direct links into an NFC tag to one or more products such as signs, stickers, eyewear frames, eyewear accessories. NFC embedded products can be used in pharmacies, medical offices, optical retailer shops, department stores, or eye doctors' offices. The NFC tag on selected products and their parts helps to enable a user to use an NFC smartphone to touch the NFC tag, to reach information via centralized connection and/or decentralized connection using the internet.

20 Claims, 16 Drawing Sheets

(58) Field of Classification Search
CPC ...... G06F 1/1684; G06F 1/1686; G06F 1/169;
G06F 1/26; G06F 21/44; G06F
2221/2129; G06F 3/011; G06F 3/0482;
G06F 3/04842; G06F 3/0486; G06F
3/0488; G06F 8/33; G06K 7/10297;
G06K 7/1417; G06Q 2220/00; G06Q
10/1095; G06Q 30/016; G06Q 30/018;
G06Q 30/0207; G06Q 30/0251; G06Q
30/0623; G06Q 30/0631; G06Q 30/06;
G06Q 50/22; G06Q 30/02; G06Q 20/321;
G06Q 20/3276; G06Q 20/3278; G06Q
20/341; G06Q 20/352; H04M 1/72412;
H04M 2250/04; G02B 2027/014; G02B
2027/0178; G02B 2027/0138; G02B
27/0172; G02B 27/017; G02C 11/10;
G02C 11/02; G02C 13/003; G02C 9/00;
H04W 4/80; H04W 76/10; H04W 76/30;
H04W 84/12; G06V 20/20; G06T 19/006;
G06N 20/00; G06N 5/04; G06N 3/02
USPC ........................................ 707/769
See application file for complete search history.

(56) References Cited

U.S. PATENT DOCUMENTS

| | | | | |
|---|---|---|---|---|
| 10,235,567 | B2* | 3/2019 | Cork | G06F 3/167 |
| 10,419,860 | B2* | 9/2019 | Cahan | H04R 17/00 |
| 10,433,078 | B2* | 10/2019 | Cahan | H04R 25/554 |
| 11,076,246 | B2* | 7/2021 | Cahan | H04R 17/00 |
| 11,100,327 | B2* | 8/2021 | Roxas | A61B 1/00055 |
| 11,373,756 | B1* | 6/2022 | Ferro, Jr. | G16H 40/63 |
| 11,393,597 | B1* | 7/2022 | Gandhi | G06K 7/1482 |
| 11,763,942 | B2* | 9/2023 | Ferro, Jr. | G16H 10/40 705/2 |
| 2011/0084834 | A1* | 4/2011 | Sabeta | G06K 19/077 340/540 |
| 2015/0002676 | A1* | 1/2015 | Yoo | G06T 19/006 348/159 |
| 2015/0346519 | A1* | 12/2015 | Filutowski | G02C 11/10 351/51 |
| 2018/0332409 | A1* | 11/2018 | Cahan | H04R 25/554 |
| 2018/0332410 | A1* | 11/2018 | Cahan | H04R 25/554 |
| 2019/0320273 | A1* | 10/2019 | Cahan | H04R 25/554 |
| 2022/0310253 | A1* | 9/2022 | Ferro, Jr. | G06T 19/006 |
| 2022/0342998 | A1* | 10/2022 | Singh | G02B 27/0172 |
| 2022/0382523 | A1* | 12/2022 | Singh | G06F 1/1686 |
| 2023/0245098 | A1* | 8/2023 | Singh | G06F 3/0482 705/41 |

OTHER PUBLICATIONS

"These Smart Glasses Could Make Getting a Shot Less Painful," Internet page printed from http://mashable.com/2013/11/20/these-smart-glasses-can-see-your-veins/ on May 13, 2014. (Year: 2014).*

* cited by examiner

EYEWEAR INFORMATION NFC EMBEDDED OR ADAPTER

NFC EMBEDDED OR ADAPTED TO EYEWEAR CASE

MEDICATION INFORMATION WITH EMBEDDED OR ADAPTED NFC TO EYEDROP BOTTLE

METHOD AND SYSTEM OF USING NFC TECHNOLOGY ON EYEWEAR FRAMES, EYEWEAR ACCESSORIES, AND EYE DROP CONTAINERS TO LINK USERS DEVICES WITH PRESCRIPTIONS AND INFORMATION

RELATED APPLICATIONS

This U.S. Patent Application is a continuation of U.S. Provisional Application No. 63/075,827 filed Sep. 9, 2020. The entire applications are incorporated herein by this reference.

FIELD OF INVENTION

This disclosure relates to a method and system comprising using NFC technology on at least one of a combination of products such as signs, stickers, eyewear parts, eye drops medication containers, medication containers, and/or eyewear accessories, providing a user with at least one form of effortless access to pre-planned information. Introduced information can be prescriptions, prescription information, weblink connection, product information, synergistic marketing, appointment scheduling links, and/or virtual audio connection to set user. Also, that information associated with the NFC tags or stickers can be selected from decentralized and centralized sources.

SUMMARY

Near-field communication technology renders a helpful way of adding programmed information onto NFC tags or stickers. By adapting or embedding these NFC tags or stickers onto a set of products such as signs, stickers, eyewear frames, and eyewear accessories, we devise a method to deliver product and service information to patients and customers. In the past, NFC devices were used as electronic identity documents, keycards, and contactless payment systems allowing mobile payment to replace or supplementing systems such as credit cards and electronic ticket smart cards. The idea is to use this same technology to create marketing techniques and service connections between a programmer of the information and the user. The programmer can be a person from a factory, business, pharmacy, optical retailer store, and/or health care providers office.

Furthermore, any health care provider such as an optometrist or ophthalmologist may be a NFC programmer as long as they have a NFC mobile application and a smartphone device. The health care provider program set NFT tags or stickers on the product to link their patients to medical prescription, medical prescription instruction, spectacle prescriptions, spectacle prescription instructions and/or contact lens prescription information. The ability to use NFC tags or stickers embedded or adapted to signs, stickers, eyewear frames, medication containers, and eyewear accessories to deliver vision prescriptions, mobile app links, weblink connections, product information, synergistic marketing, appointment scheduling links, and/or virtual audio telemedicine enables the user to access information fast and accurately.

DETAILED DESCRIPTION OF THE INVENTION

Figure 1:
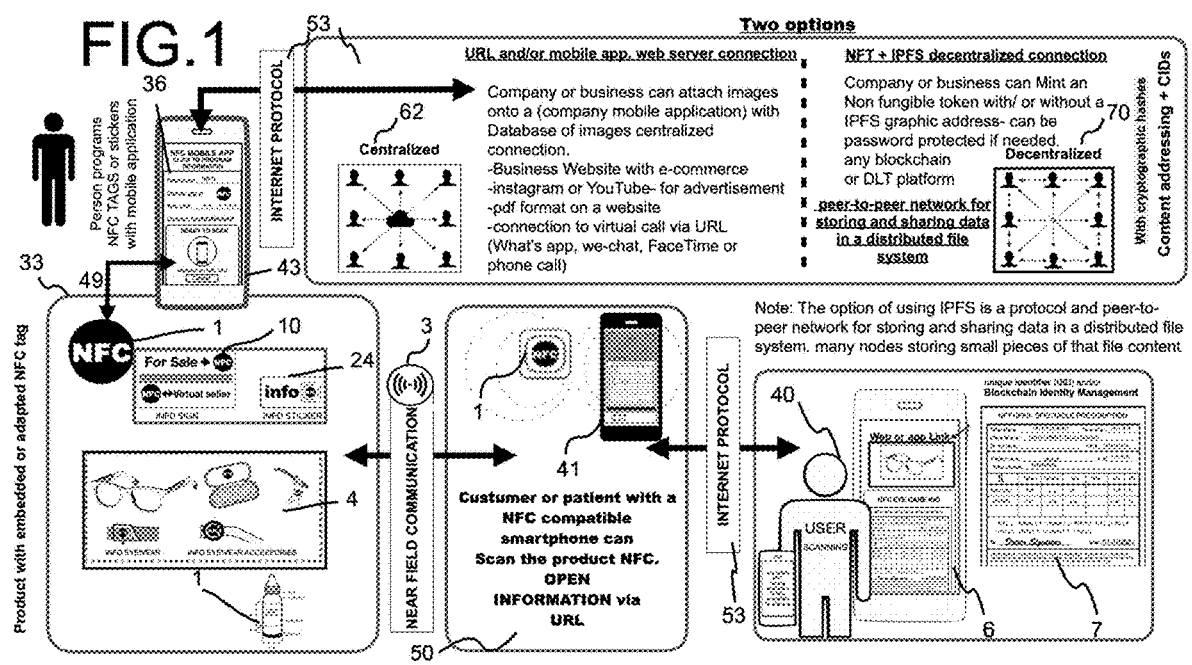
FIG. 1, is an illustration of a pictorial workflow, system and method for uploading product information and content by a health care provider, retailer, manufacturer, or employee according to an embodiment of the disclosure.

The following embodiment involves a system and method for using a selected group of products 33 where the products 33 have embedded or adapted near field communication tags 1 that are used to deliver user 40 with at least one of the following information, health care provider 15 prescriptions use information, loyalty points, eye exam prescriptions, product information, health care provider 15 appointment scheduling and/or virtual audio telemedicine direct connections. Where set products 33 with its NFC tags 1 or stickers 24 can be programmed by any person with a smartphone mobile application from at an online optical store, online optical retail store, optical retail store, health care provider 15 office, optometry office, and/or any business. Where the programmed links may be at least one of the following to (internet protocol URL link) 53 URL, IPFS 48, non-fungible tokens 71 (NFT), cryptocurrency token 71, transaction hash 47, digital coupons 69, virtual eye doctor connection 59, virtual seller connection 59, loyalty programs, and/or access at least one mobile application. Where the combination of ways to deliver information with set products 33 enables a multi form of marketing 12 to customers or patients is via with a user 40 with a smartphone 41 (action of tapping 3) onto the NFC tags 1.

Where during the embodiment of the system and method, we will use the word (user 40) to mean customers or patients. Where via the tapping 3 or scanning 3 of the NFC tags 1 the links the user 40 to at least one of the following information, medication use information, eyewear data, loyalty programs, advertisement flyers 60, health care provider 15 scheduling service information, a website and/or a video audio telemedicine connection. The following is described in such a way that one should understand as the presentation and utilization of such patient retention marketing 12 strategies illustrate various uses of the inventions. Rather than dividing the system and method of the inventions into multiple separate patent applications, we have arranged these inventions into a single document because the associated matter presents itself as a combination of techniques, use, and methods for the system to operate.

The following involves using at least one portable electronic device with a mobile application that can be used by a human from a factories, businesses, health care provider 15 offices, optical retail shops, optometry offices, pharmacies, or more near field communication tags or chips 27 that are embedded or adapted to at least one or more products 33 including signs 10, stickers 24, eyewear, eyewear accessories 4 and medication containers 9 to provide information via web (internet protocol URL link) 53 URL links and/or IPFS 48 Inter Planetary File System links. These near-field communication tags or stickers 24 are covered with heat and and/or weatherproof 26 material and are embedded to a list of products 33. NFC 1 stands for near-field communications and goes by the acronym NFC 1. NFC 1 is simply a set of standards for smartphones to establish communication with each other by bringing them into near distances, typically zero to five centimeters. It establishes ability to send and acquire information.

The general use of NFC 1 technology has been seen in NFC 1 badges for entrance access, social media links stickers 24 using NFC tags 1, and NFC 1 technology on smartwatches, cards, and smartphones for payments. This is becoming to be normalized due to the ease of use with portable electronic devices and information exchange at small distances such as QR codes. Communication is possible between an NFC 1 device and an unpowered NFC 1 chip 27, called a tag or sticker. NFC 1 is a technology that allows a user 40 to (wave, scan 3, or tap 3) a tablet or smartphone over an NFC 1 tag or sticker to communicate programmed information and over a short range as long as the portable electronic device is compatible.

During the explanation of the invention, we will use the word (scan 3) to suggest (waving or tapping 3 with an NFC compatible portable electronic device onto a NFC tag 1 or sticker). During this description of the embodiment, we will include NFC tags 1 to mean near-field communication stickers 24 or tags. Our method and system involve using NFC tags 1 or stickers 24 embedded no to particular products 33 to create ease to link users 40 or prospective customers or patients with a particular list of programmed link information. The idea involves accommodating user 40 with the ability to access other types of information and access points using NFC tags 1 links systems where information to the user 40 with NFC 1 compatible computing devices can link to video/audio 59 communication linking, mobile application links, website (internet protocol URL link) 53 URL, blockchain smart contract 46 links, distributed acyclic graphs ledger, distributed ledger technology history, cryptocurrency addresses, crypto token 71, transaction hash 47 links and/or IPFS 48 links.

The IPFS 48 is a protocol created by Juan Benet. The InterPlanetary File System (IPFS 48) is a peer-to-peer file system that seeks to connect one or more computers nodes with one or more corresponding files system. IPFS 48 are composed of computer nodes that do not need to trust each other. The programming links using IPSF images or files linking to NFC tags 1 or stickers 24, we can provide a new way to use NFC 1 technology to transfer decentralized 70 information in the health care provider 15 and non-health care provider 15 departments.

The programmed NFC tags 1 or stickers 24 are attached or embedded onto a set of products 33. The following list of products 33 are signs 10, stickers 24, eyewear parts, eyewear accessories 4, and/or medication containers 9. One or more specific embodiments of the present methods and systems used will be described below. The products 33 listed are all used as a method to supply health care provider 15 information instructions, provide prescription information, marketing 12, advertisements, Brand 5 awareness, and develop a connection between eye doctors, health care provider 15 offices, or optical chain stores and patients or customers.

NFC sticker 1 and NFC tag 1 are near-field communication devices that can be pre-programmed by NFC 1 writing technology. Since most new smartphones in the market contain NFC 1 writable and readable systems incorporated into their hardware, we included the embodiment of the set of products 33 with NFC tags 1 to program. Although some smartphones in the market may require an additional mobile application to read or write NFC tags 1, a simple way to download set mobile application is accessible to any app store. This brings ease and facility for any factory, optical chain store, optometrist office and/or health care provider 15 office, supermarket, store, or pharmacy to be able to use such technology to facilitate the use of such method of information transfer.

Most NFC tags 1 or stickers can be pre-programmed with a unique Universal Resource Locator (internet protocol URL link) 53 and/or the or IPFS 48 addresses using a mobile application. The IPFS 48 unlike the traditional data retrieving methods websites, IPFS 48 files are based on their content. The idea to have health care providers 15 offices, optical shops, pharmacies and/or clinics with computing devices that are connected to IPFS 48 systems. Each of these devices are called nodes and can be a personal computer, smartphone, laptop or any computing device with its operating system running and capable of sending/receiving data.

The proposal of using the IPFS 48 protocol is to remove the centralized server and create a combination of a centralized and decentralized 70 network of nodes. Part of the method and system of our patent involves using existing Web and IPFS 48 technology to incorporate centralized and/or decentralized 70 network of nodes to deliver information such as health care provider 15 prescriptions, spectacle prescription 7, advertisement coupons vouchers, medication use instruction, eyewear use instructions, loyalty point systems, sales flyers 60, medical and/or eyewear product information via programmed NFC tags 1 embedded or adapted to particular products 33. This means that we may abandon or combine the concept of using centralized and decentralized 70 systems such as (internet protocol URL link) 53 URLs or may also combine both systems to retrieve data and also use potentially one or more nodes IPFS 48 system to connect information to products 33 across the world. This technique can be capable of storing and sharing health care provider 15 information, sales coupons, sales flyer 60, prescription data between each other via the scan 3 of an NFC 1 tag on the said products 33.

A IPFS 48 systems works by having one or more one or more computer nodes storing parts of one or more files. This means that instead of retrieving the file from one location, you actually retrieve one or more parts of the file from multiple nodes. While the regular centralized system and (internet protocol URL link) 53 URLs linking can also be useful for other added application systems within the embodiment. In FIG. 1, we see an illustration of a method of a human programming information to NFC tag 1 by a programmer (retailer, manufacturer, health care provider 15, optician or employee) according to an embodiment of the disclosure.

On FIG. 1 a human person programming the NFC tags 1 or stickers may be a person in a retailer store, factory, manufacturers and/or business. where the programmer 42 with a smartphone running NFC 1 mobile application can upload and/or write the programming links to the NFC tags 1 that are embedded or adapted to a series of products 33. Where the products 33 used are information signs 10, information stickers 24, eyewear accessories 4, eyewear and/or sometimes medication container 9. Where the programming links can be done via a mobile application and may include links with a unique identifier, (internet protocol URL link) 53 URL links, minted non-fungible tokens 71 links, IPFS 48 links, transaction hash 47, distributed ledger information, and/or any type of information linking can be written on the NFC tags 1 that are on the products 33.

The idea is to let any human user 40 to scan 3 or tap 3 the product with an NFC 1 enabled users smartphone 41 to view and/or upload health care provider 15 prescription information, health care provider 15 prescriptions, telemedicine connection, visual/audio calls, spectacle prescriptions 7, eyewear make model product information; eyewear accessories 4 make model product information, unique identifier and/or business website information. This communication transfer can be done via the information programed on the NFC 1 tag that is adapted to a selection of products 33 where the source of the programming can be prepared via a decentralized 70 and/or central server in accordance with the present disclosure. Where method and system of the types of programming of the NFC 1 sticker 1 and NFC 1 tag can be different for any of the products 33 and its parts.

Where the information involved may also be the use of a combination of health care provider 15 service and product marketing 12. The method and combination of advertisement of one or more of the products 33 with its embedded or adapted NFT tags that used to provide an aggregate or pattern of marketing 12 techniques, loyalty programs and/or marketing 12 strategies. An example (internet protocol URL link) 53 URL is linking consists of using [www.Thedomainname.com] with its file path, parameter string and/or anchor. The (internet protocol URL link) 53 URL, (internet protocol URL link) 53 URL Deep linking and/or Mobile App (internet protocol URL link) 53 URLs/Linking can connect you to the desired website, service and/or mobile application link depending on the programmed information on the near field communication tag or sticker.

Examples can also be using video/audio 59 calling app linking such as https://wa.me/1111X111111. Where the use of Use https://wa.me/<phone number> where the <number> is a communication phone number format. The ability to program the NFT tag 1 with a particular website link built in the messaging system can also be done. In the case of using IPFS 48. An example IPFS 48 consisting of https://IPFS.io/IPFS/QmbxhUxsKSsDjonPXsp5Cz7KxUJmPNoBkBtqMqMzZ4PN5R/image.png, where [content based addressing] is the Hash 47 code, and the image/Page png is the file that identifies the decentralized 70 servers over the (internet protocol URL link) 53. In future setting, a the possibility to add other addresses that may involve interactive application and/or audio/video connection can also occur.

Each near field communication sticker or tag may be unique and may vary in size as described, allowing the NFC 1 tag to be adapted to particular product eyewear parts, signs 10, stickers 24, and/or medication containers 9 when receiving the request. Most smartphones in the market have NFC 1 enabled capabilities, consisting of components, and may be configured to download a mobile application for data communication, storing, or displaying content related to information onto the NFC 1 tag. We can see in FIG. 1 that a user 40 using the mobile application can program desired NFC tags 1 via two different options depending on the tags and product with its products 33 list. The programmer 42 can be anyone with a mobile device running the programming NFC 1 mobile application.

The programmer 42 and user 40 both use portable electronic device such as a smartphones to write or read the NFC tags 1. Also the user 40 can use the smartphone to communicate with central servers or decentralized 70 nodes of computers links. After a company or programmer links their selected NFC 1 and products 33 with the information and connection link needed, it can decide what to do with each product. The scanning 3 user 40 can use his or her NFC 1 capable smartphone to gather the information that was programmed by the programmer's 42 device.

Figure 2:
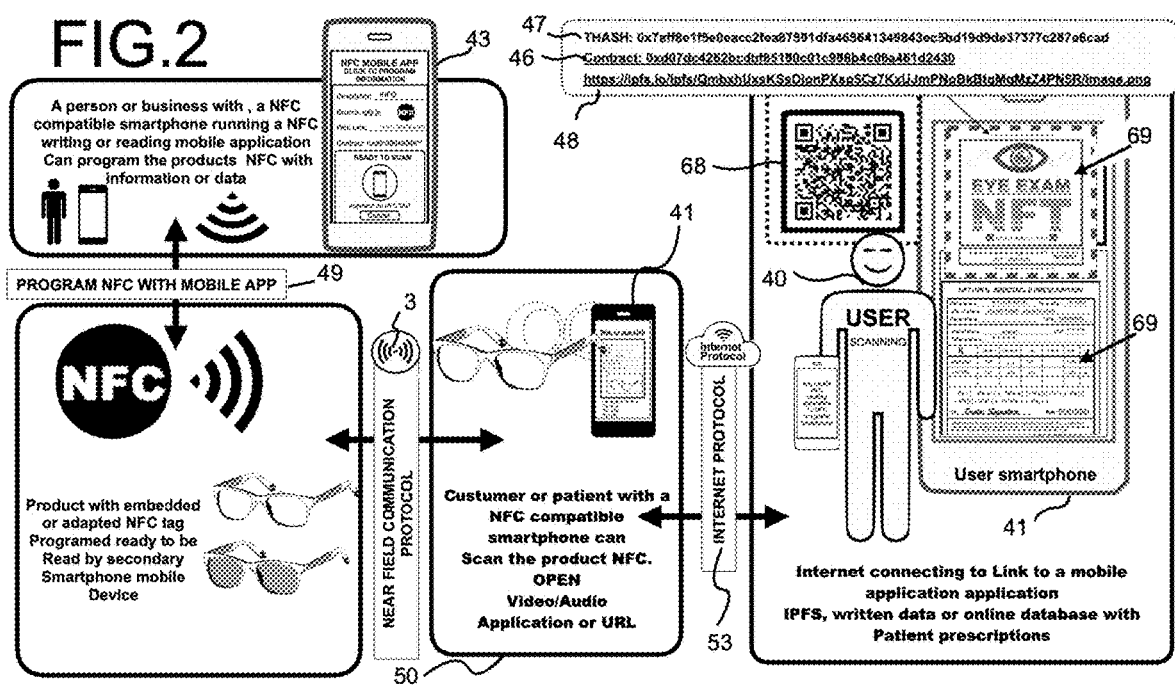
FIG. 2 illustrates an embodiment of eyewear that can be eyeglasses, sunglasses, or reading glasses that have NFC tags onto any of its parts. Where the eyewear with its NFC can be programmed with an NFC mobile application deliver links to the desired URL, mobile App URL link, video/audio telemedicine connection, digital coupons, vouchers, spectacle prescriptions, IPFS prescriptions and/or any Universal links. Where the eyewear NFC can also be programmed with a web-based database or link to a specific transaction hash, smart contract, IPFS link, and/or online prescription database to validate the authenticity and prevent fraud.

Turning to FIG. 2, we have another setting where of eyewear that can be eyeglasses, sunglasses, or reading glasses that have NFC tags 1 onto any of its parts. Where the eyewear with its NFC 1 can be programmed by a programmer 42 with an NFC 1 application or software to program links to the desired (internet protocol URL link) 53 to mobile App, (internet protocol URL link) 53 URL link, video/audio 59 telemedicine connection, NFT coupons or vouchers, spectacle prescriptions 7, NFT prescriptions, IPFS 48 prescriptions and/or any Universal links. Where the eyewear NFC 1 can also be programmed with a web-based database or link to a specific transaction hash 47, smart contract 46, IPFS 48 link, and/or online prescription database to validate the authenticity and prevent fraud. Where information is programmed on this product, NFC tags 1 can achieve online connection links such as NFT or image-based coupons, telemedicine video/audio 59 connection, eye examination scheduling link, NFT health care provider 15 service coupons, and/or vouchers. Where the user 40 can hold the coupon in an NFT wallet where it can be used in the selected optical store, health care provider 15 offices such as pharmacies, optical shops, optometry offices and/or ophthalmology offices.

Figure 3:
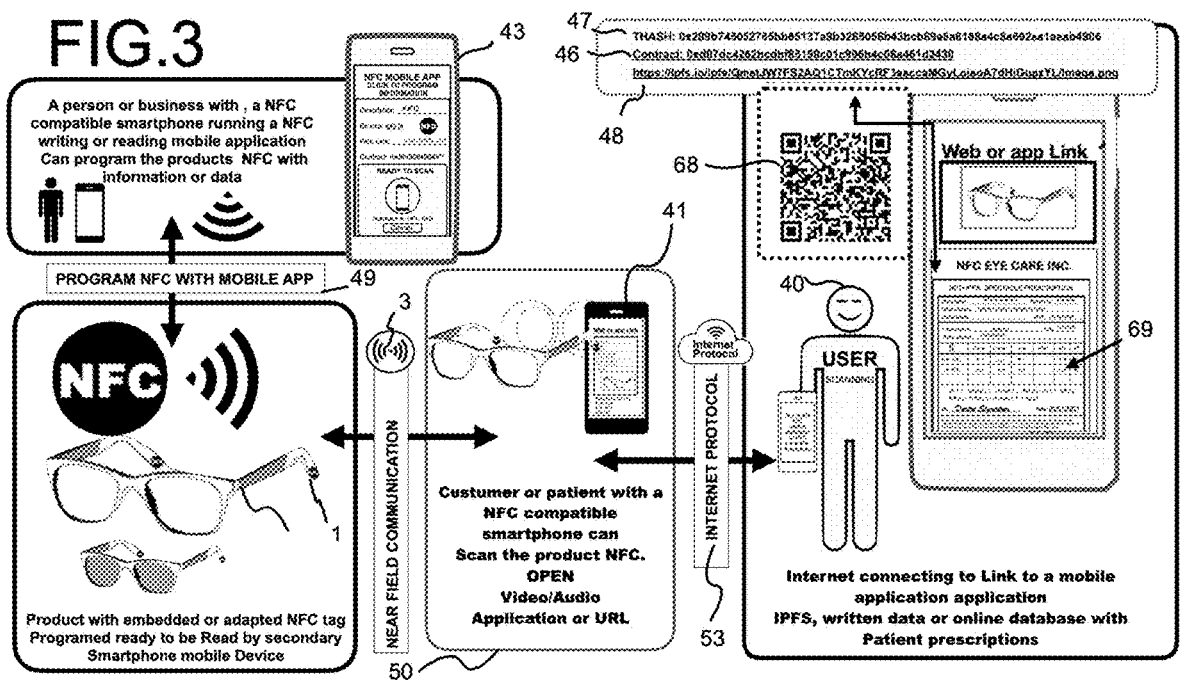
FIG. 3 illustrates another embodiment of eyewear shop, health care providers (eye doctors) office has eyewear that can be eyeglasses, sunglasses, or reading glasses that have embedded or adapted NFC tags of any type or any size. The eyewear with its NFC can be programmed with the designated URL Link, Mobile App URL link, and/or Universal links. Where the eyewear NFC can also be programmed with a web-based database or link to a specific transaction hash, smart contract, IPFS link and/or online database.

In FIG. 3, we have another setting where an eyewear shop, health care providers 15 (eye doctors) office has eyewear that can be eyeglasses, sunglasses, or reading glasses that have embedded or adapted NFC tags 1 of any type or any size. The eyewear with its NFC 1 can be programmed with the designated (internet protocol URL link) 53 URL Link, Mobile App, (internet protocol URL link) 53, and/or Universal links. Where the eyewear NFC 1 can also be programmed with a web-based database or link to a specific transaction hash 47, smart contract 46, IPFS 48 link and/or online database. Information that can be contained can be spectacle prescription 7 of the user 40 or patient, Branding 5, frame A measurement, frame B measurement, or any specification of the eyewear frame or lenses and their power, where information such as transaction hash 47, smart contract 46, IPFS 48 link, and/or (internet protocol URL link) 53 can be used to validate the authenticity and prevent prescription 7 fraud.

Figure 4:
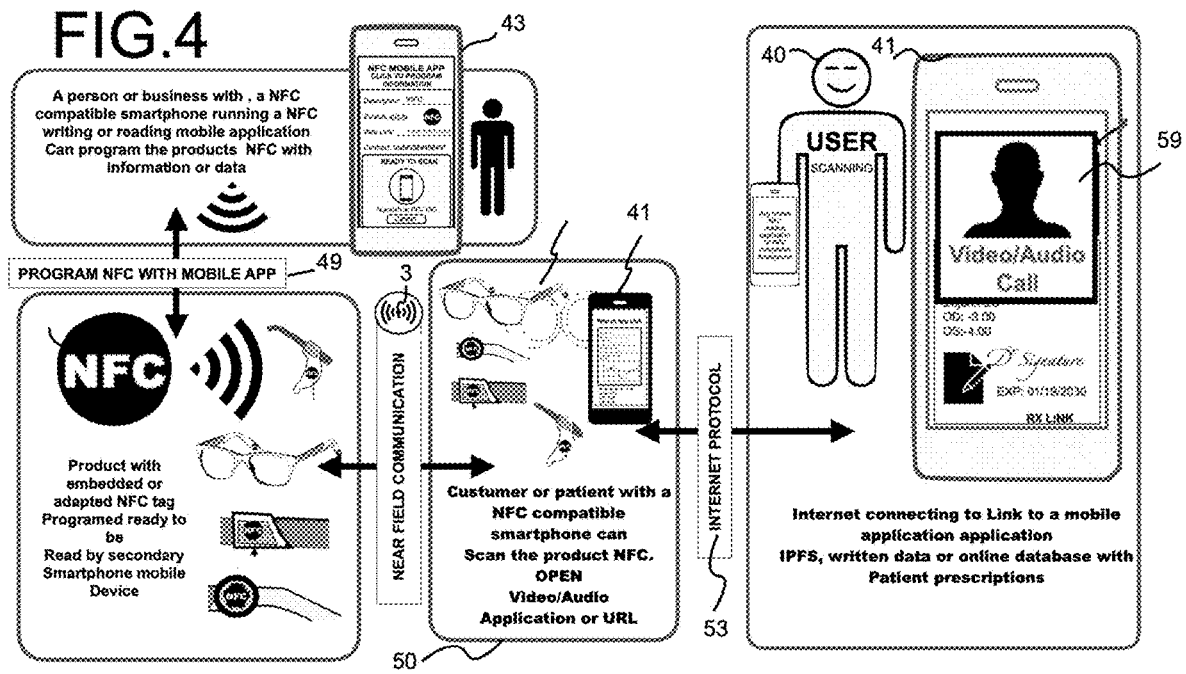
FIG. 4 illustrates an embodiment of person programming an NFC embedded or adapted to eyewear frame or eyewear accessories. The eyewear accessories can be eyeglasses, ear gripper holders, eyeglass nose pads, and/or eyewear adapters, comfort temples and/or tips. Retainer extender adapted or with embedded NFC tags.

Continuing on FIG. 4, illustrates a pictorial representation of a person programming an NFC 1 tag or sticker embedded or adapted to eyewear frame or eyewear accessories 4. The eyewear accessories 4 can be eyeglasses, ear gripper holders, eyeglass nose pads 66, and/or eyewear accessories 4 adapters, comfort temples 51 and/or tip 67. Retainer extender adapted or with embedded NFC tags 1. Where the information programmed can be a (internet protocol URL link) 53 or link to the prescription of the eyeglasses and/or contact lenses prescription 52 including power cylinder, axis, power, pupillary distance, prescription expiration date, office address, office phone number, doctor name, doctor signature, materials of the lenses used and another information needed for prescription spectacle eyewear online optical store, eyewear optical store, optometric or ophthalmology setting. Where it can also be programmed with (internet protocol URL link) 53, IPFS 48 links, mobile app internet protocol link 53, and/or universal links information that can be scanned 3 by the user 40 with an NFC 1 compatible computing portable device such as a smartphone. Where the eyewear or eyewear accessories 4 can also be programmed with the contact information, telemedicine scheduling system links, or video/audio 59 call to a telemedicine health care provider 15 or optometric or health care provider 15 office.

Figure 5:
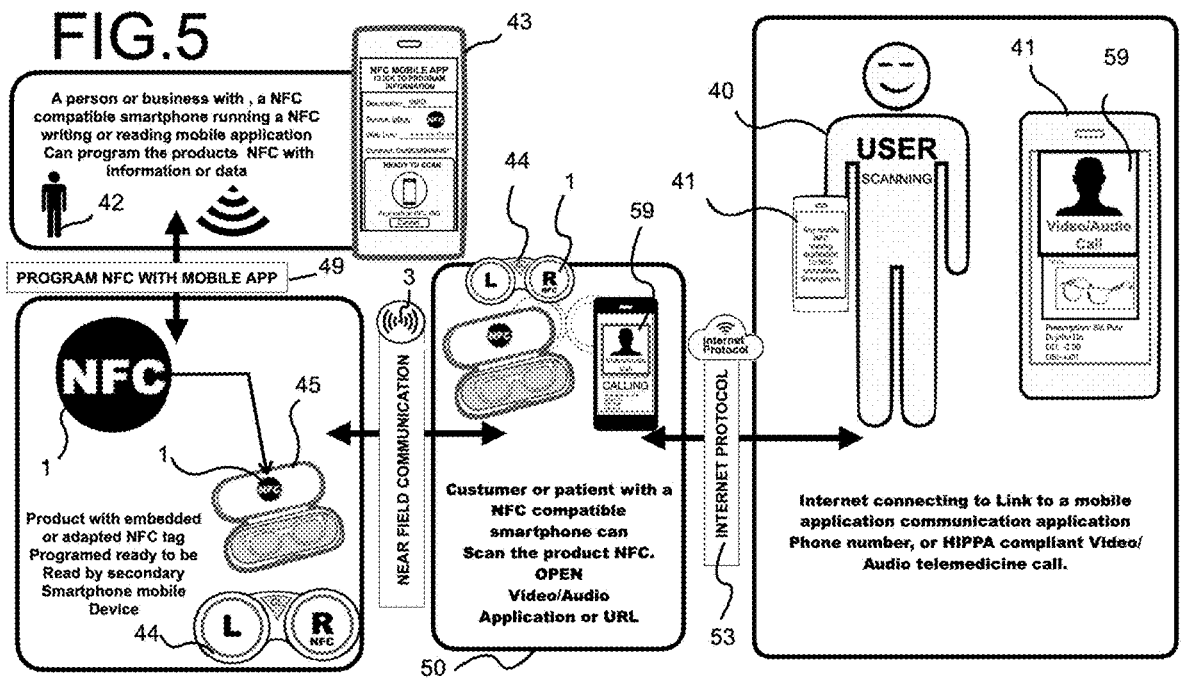
FIG. 5 illustrates an embodiment of a person programming an NFC that is embedded or adapted to eyewear cases or contact lenses cases.

Continuing on FIG. 5 illustrates a pictorial representation of a person programming an NFC 1 that is embedded or adapted to eyewear cases 45 or contact lenses cases 44. Where the programmer 42 can be an optician or health care provider 15 such as an optometrist or ophthalmologist. Where all prescription information should be validated by a licensed health care provider 15. Where the information programmed can be the prescription of the eyeglasses and/or contact lenses prescription 52 including power cylinder, axis, lens power, base curve, prescription expiration date, office address, office phone number, doctor name, materials of the lenses used, and other information needed for prescription eyewear online optical store, eyewear optical store, optometric office or ophthalmology office. Where the programming of the information can be via (internet protocol URL link) 53, IPFS 48 link, mobile App link, and/or universal links and can be scanned 3 by the user 40 with an NFC 1 compatible computing portable device such as a smartphone 41. Where the eyewear cases 45 or contact lens case 44 can also be programmed with the contact information or universal link to a telemedicine scheduling system and/or video/audio 59 call to a telemedicine health care provider 15 or optometric or health care provider 15 office.

In the case of programming the NFC tags 1 on the eyewear case 45 or contact lens case 44. One can also link 3 the user 40 to a secure address where they can acquire the contact or eyeglasses information. The capabilities of a health care provider 42 15 in office with the mobile application to write onto NFC tags 1. Where the health care provider 15 can be an optometrist, and/or ophthalmologist where they can also program the NFC tags 1 or sticker with information links. Where the link can be medical prescription information, medical prescription instruction, eyewear prescription information and direct link to scheduling connection to a video/audio 59 telemedicine connection.

Figure 6:
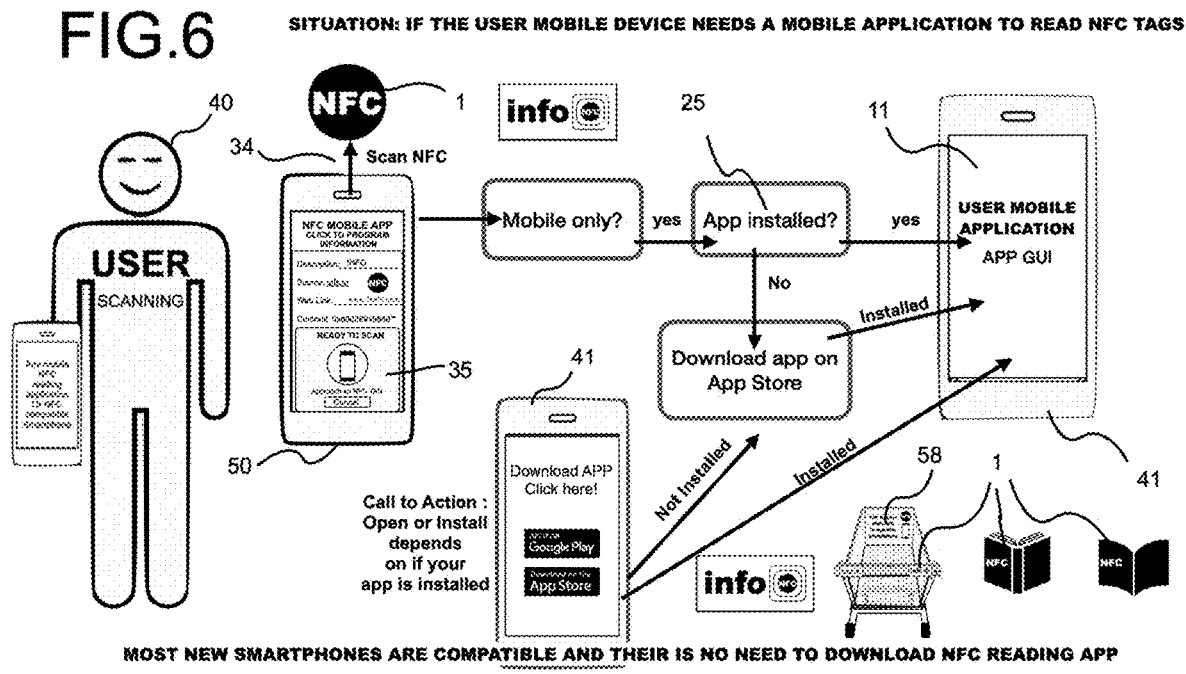
FIG. 6 illustrates an embodiment of a user that can use his or her NFC-compatible smartphone to tap or scan an NFC tag that is embedded or adapted to any of the product's signs, stickers, eyewear, or eyewear accessories.

Continuing on FIG. 6 illustrates a pictorial representation of a user 40 that can use his or her NFC 1-compatible smartphone 41 to tap 3 or scanned (34) on a NFC 1 tag that is embedded or adapted to any of the product's signs 10, stickers 24, eyewear, or eyewear accessories 4. The user 40 can be an existing or prospective patient or customer. The NFC 1 tag is programmed to open a particular mobile application 25 to display user mobile application, or weblink via the smartphone user interface (GUI) 11. Where via the link, the user's 40 smartphone 41 can be forwarded to a page where they can download the mobile application 25. Where via information NFC stickers 24 can be put on shopping carts 58, books and/or magazines.

Where the user 40 smartphone device is NFC 1 enabled and NFC 1 compatible. The user 40 smartphone 41 device may include at least one central processing unit with its operating system and user interface (GUI) 11. The user 40 computer system device or smartphone 41 can have an NFC 1 reading mobile application open if needed. Where in some cases of some smartphones may not require any NFC 1 mobile application to execute a reading of the NFC 1 tag or sticker.

Figure 7:
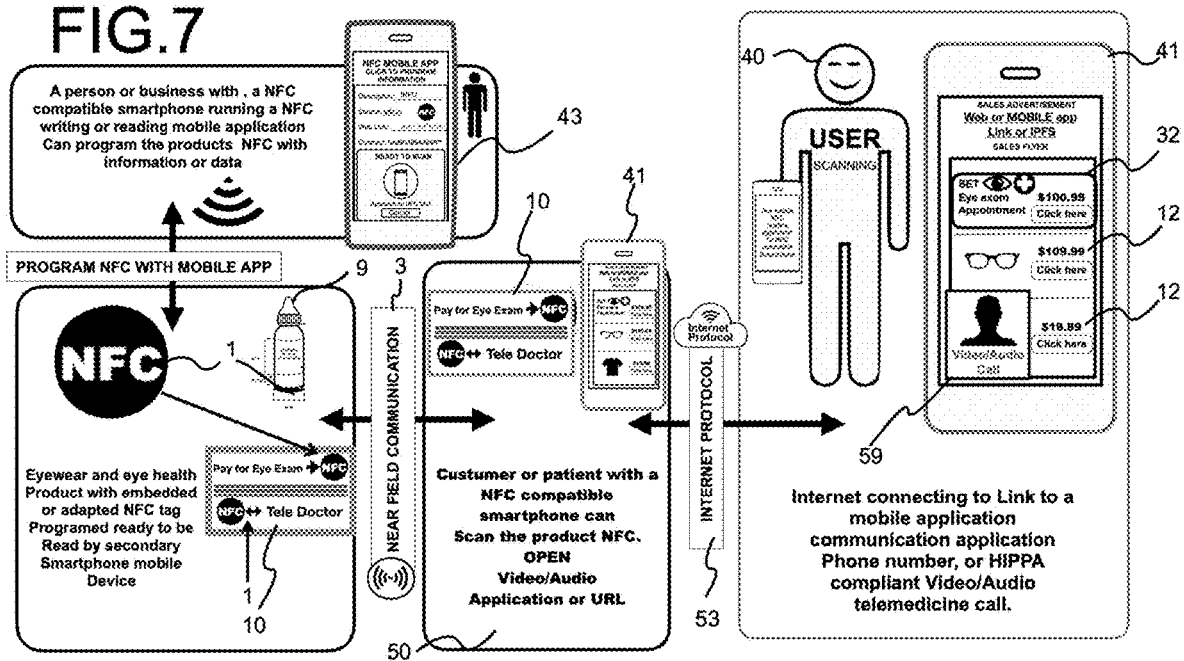
FIG. 7 illustrates different embodiments of an information sign and/or eye drop medication container that has embedded or adapted NFT tags that may be programmed.

Continuing on FIG. 7 illustrates a pictorial representation of an information sign 10 and/or eye drop medication container 9 that has embedded or adapted NFC tags 1 that may be programmed. The information sign design is configured to have two different NFC tags 1 or stickers. Where the information sign is divided into two parts, top, and bottom, NFC 1 tag on the sign is for a link to the payment portal, and the second bottom NFC 1 tag is too for a direct web link connection to an app or web-browser video audio call. The video/audio 59 or audio call can be for telemedicine purposes if needed.

Figure 8:
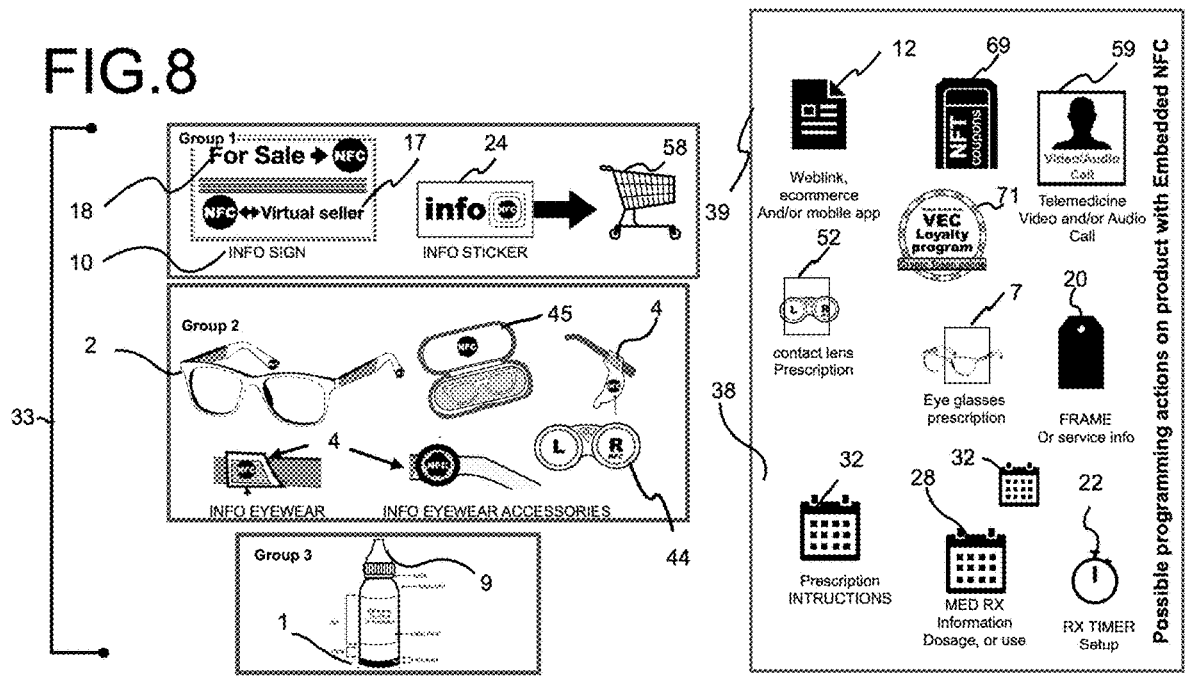
FIG. 8 illustrates an embodiment of a three-group of selected products with embedded or adapted NFC tags or stickers and a list of programming options for each NFC tag or sticker embedded or adapted to the any of the groups of products.

Continuing on FIG. 8, illustrates a pictorial representation of three-group of selected products 33 with embedded or adapted NFC tags 1 or stickers 1. The first group of products 33 is information signs 10, Information stickers 24 that can be used on shopping carts 58 handles, tables, or any surface. The second group of NFC 1 products 33 includes the following: contact lens cases 44, eyewear cases 45, eyeglasses 2, sunglasses 2 or reading glasses frames 2, and eyewear accessories 4. The third group of products 33 is a medication container 9 such as an eye drop medication container 9 with an adapted NFT tag or sticker on the base. Where a list of programming options may be weblink address 12, contact lenses prescription 52, prescription instructions 32, token coupons 71, video audio connection 59, scheduling link 32, eyewear information 20, timer 22 setup, eyeglasses prescriptions, loyalty program point system, and payment portal.

Figure 9:
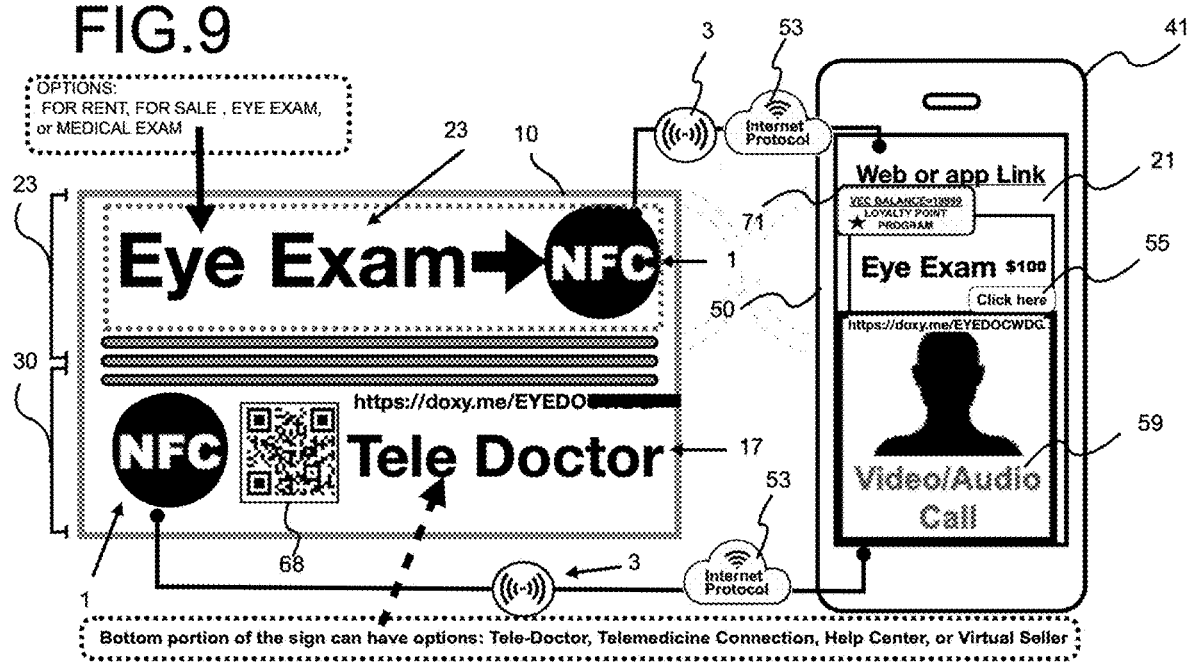
FIG. 9 illustrates an embodiment of an information sign with embedded or adapted NFC tags. The top of the information sign includes words that can be read. The top of the sign displays a symbol with an NFC tag to scan or tap to pay for service. The bottom part of the information sign contains letters that can read to connect via video audio connection where option of QR code is provided.

FIG. 9, illustrates a pictorial representation of an information sign with embedded or adapted NFC tags 1. The top of the information sign 10 includes words that can be read (FOR RENT, FOR SALE 18, EYE EXAM, or MEDICAL EXAM) 23. The top of the sign displays a symbol with an NFC 1 tag to scan 3 or tap 3 to pay for service. The bottom part of the information sign 10 contains letters that can read (Tele-Doctor, Telemedicine Connection, Help Center, or Virtual Seller 59).

The bottom portion of the information sign 10 contains words and a symbol. The symbol can have an NFC 1 tag or sticker embedded or adapted onto it. There is also an option of having a QR code 68 to direct patients or customers to a direct video audio link or audio link 59. The action of tapping 3 with an NFC 1-compatible smartphone-connected said user 40 to the telemedicine doctor via video audio call and to pay for portal via the link provided 21. An optional link can be used to use a loyalty point system 71 to receive or use loyalty points 71 for services or products 33.

In the case of the information sign 10 a user smartphone 41 may tap 3 the NFC 1 tag or scan 3 a QR code 68 to connect or schedule a telemedicine doctor via video audio call 59. The user 40 can also tap 3 on the top of the sign where the link 53 can direct them to pay for medical services 55. The information signs 10 can be modified to be used for other marketing 12 and communication services such as linking to virtual sellers or helpers in stores and in and out of health care provider 15 offices. The information signs 10 can also be weatherproof 26 and can position in store fronts, car dealerships and/or inside or outside of any vehicle windows to deliver information and virtual seller information.

Figure 10:
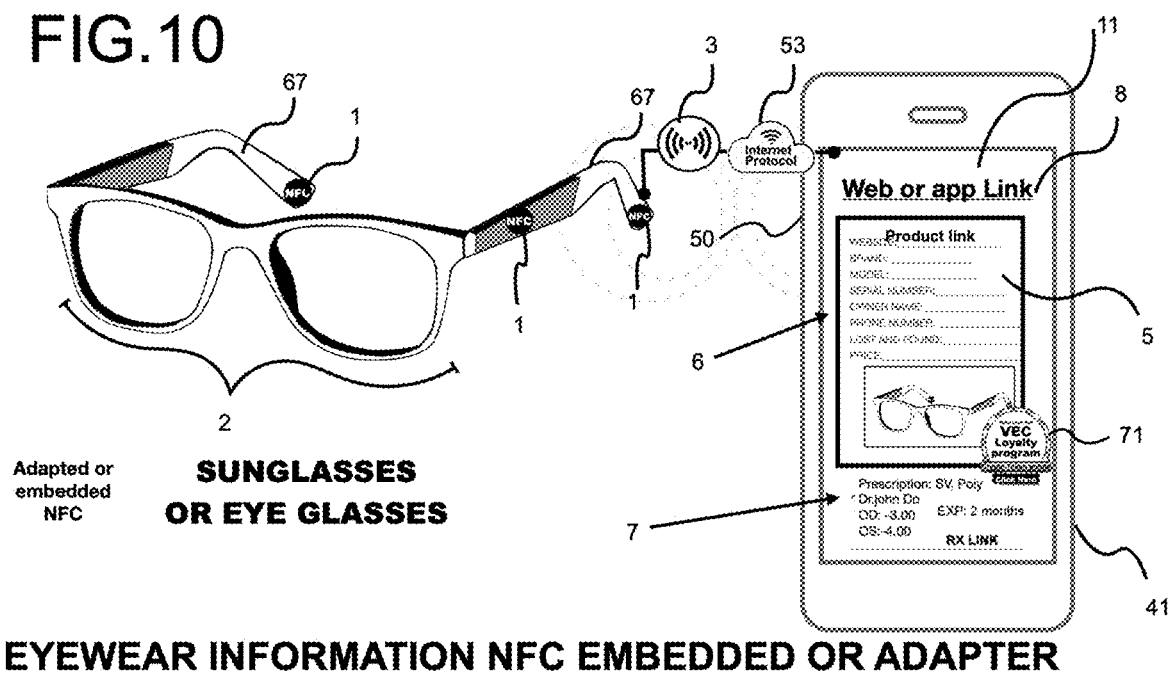
FIG. 10 illustrates an embodiment of a set of eyewear, sunglasses, or eyeglasses frames. The embedded or adapted Near field communication tags may be on any part of the eyewear frame. The NFC tag can be programmed to transmit certain information. Whereby scanning or tapping one of the NFC tags with an NFC-compatible smartphone it relays webpage information, app link to the smartphone user interface.

Continuing on FIG. 10, it illustrates a pictorial representation of a set of eyewear 2, sunglasses 2, or eyeglasses frames 2. The embedded or adapted Near field communication tags 1 may be on any part of the eyewear frame 2. The NFC 1 tag can be programmed to transmit 3 certain information. Whereby scanning 3 or tapping 3 one of the NFC tags 1 with an NFC 1-compatible smartphone it relays webpage information 11, app link to the smartphone user interface (GUI) 11.

The user 40 smartphone 41 device entices the HTTP (internet protocol URL link) 53 URL to a central server or decentralized 70 nodes on the IPFS 48 network to gather the information. The communication transfer can be via any cellular wireless network to connecting to the smartphones browser. The information obtained can be the product information such as Brand 5, website, serial number, model, owner names, phone number, lost and found a link, and/or price of the product. Where via secondary NFC 1 tag scanning 3 of the other parts of the eyewear frames parts can read information such as prescription of the eyeglasses for the right and left eye. Type of material used on lenses, doctors' information, optical information and/or eyeglasses prescription expiration date 7 (FIG. 10).

The information that is read can be a link to product information such as Brand 5, website, serial number, model, owner names, phone number, lost and found weblink, and/or product price. Where via secondary NFC 1 tag scanning 3 of the other parts of the eyewear frames parts can read information such as prescription of the eyeglasses for the right and left eye. Type of material used on lenses, doctors' information, optical information and/or eyeglasses prescription expiration date. Where at least one of the NFC 1 tag on the eyewear frames can link to the marketing 12 loyalty point or coupons.

Figure 11:
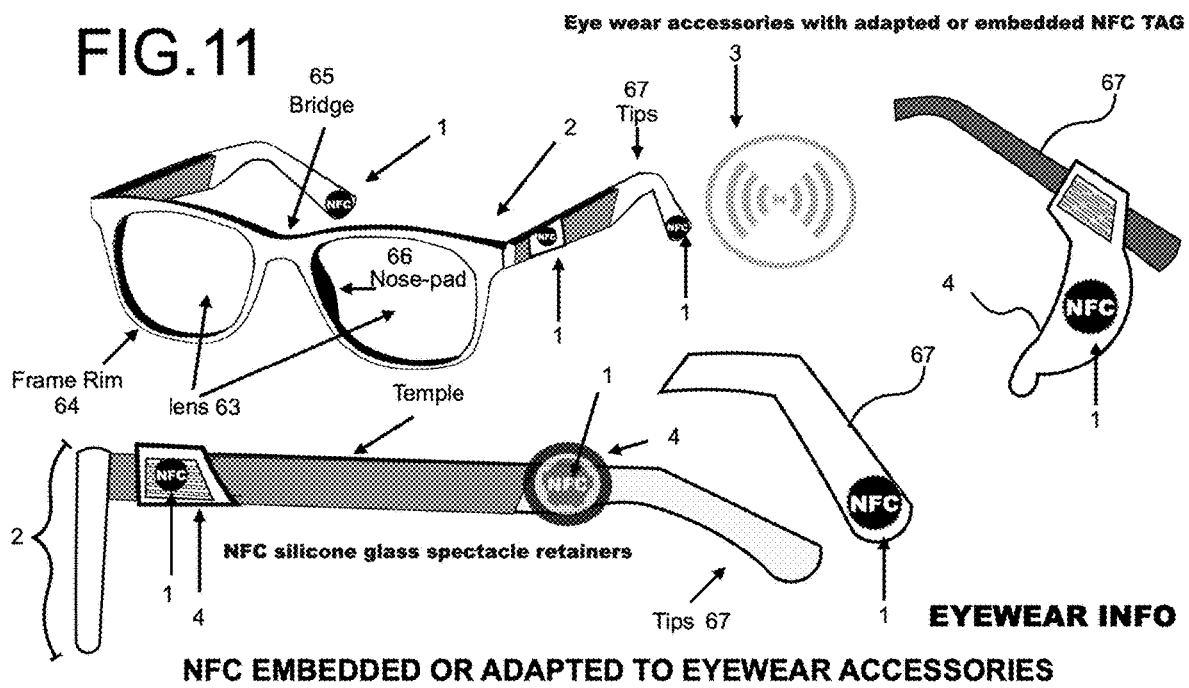
FIG. 11 illustrates an embodiment of a set of eyewear, sunglasses, or eyeglasses frames. The frame has embedded and/or adapted near-field communication tags onto at least one of its parts. At least one of the NFC tags can be programmed to link a user to particular information.

Continuing on FIG. 11 illustrates a pictorial representation of a set of eyewear accessories, sunglasses, or eyeglasses frames. The frame has embedded and/or adapted near-field communication tags onto at least one of its parts. At least one of the NFC tags 1 can be programmed to link a user 40 to particular information. One or more NFC tags 1 on the eyewear frames can present at least one information link. The NFC 1 tag can be embedded or adapted to any part of the eyewear frame, such as spectacle frame decorations, temples 51, legs nose pads 66, frame rim 64, frame bridge 65, frame tip 67, frame lens and/or spectacle retainers earpieces.

Figure 12:
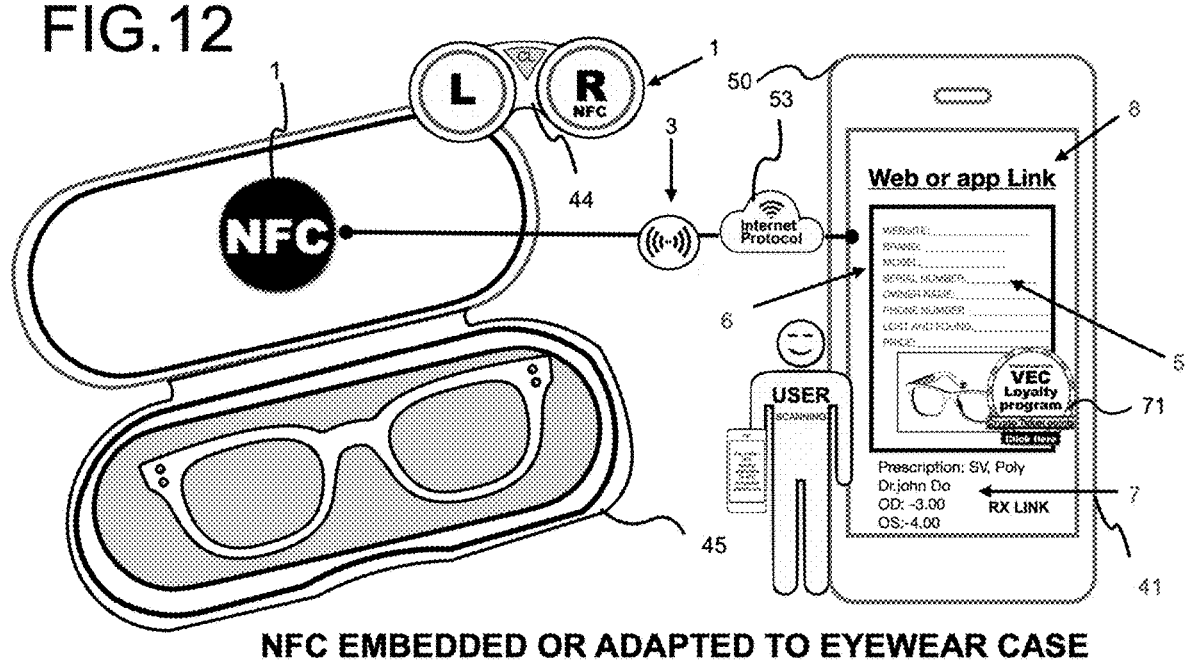
FIG. 12 illustrates an embodiment of a set of eyewear cases and/or contact lens cases with embedded or adapted near-field communication tags or stickers. The link information can be programmed onto the NFC sticker to bring up prescription information, loyalty program points system, weblink and/or mobile applications.

Continuing on FIG. 12 illustrates a pictorial representation of set of eyewear cases and/or contact lens cases 12 with embedded or adapted near-field communication tags or stickers 24. The link information can be programmed onto the NFC 1 sticker to bring up eyewear frame information 5, prescription information 7, loyalty program points system 71, weblink and/or mobile applications. The user 40 can be a patient or customer and can retrieve eyewear information or contact lens information by the user 40 using NFC 1 devices according to an embodiment of the disclosure. The user 40 using NFC 1 enabled smartphone device to taps 3 or scanned 3 on programmed NFC 1 tag or sticker embedded or adapted to the eyewear case or contact lens case container. The health care provider 15 or optician can program information to set NFT 1 tags or stickers 24.

Figure 13:
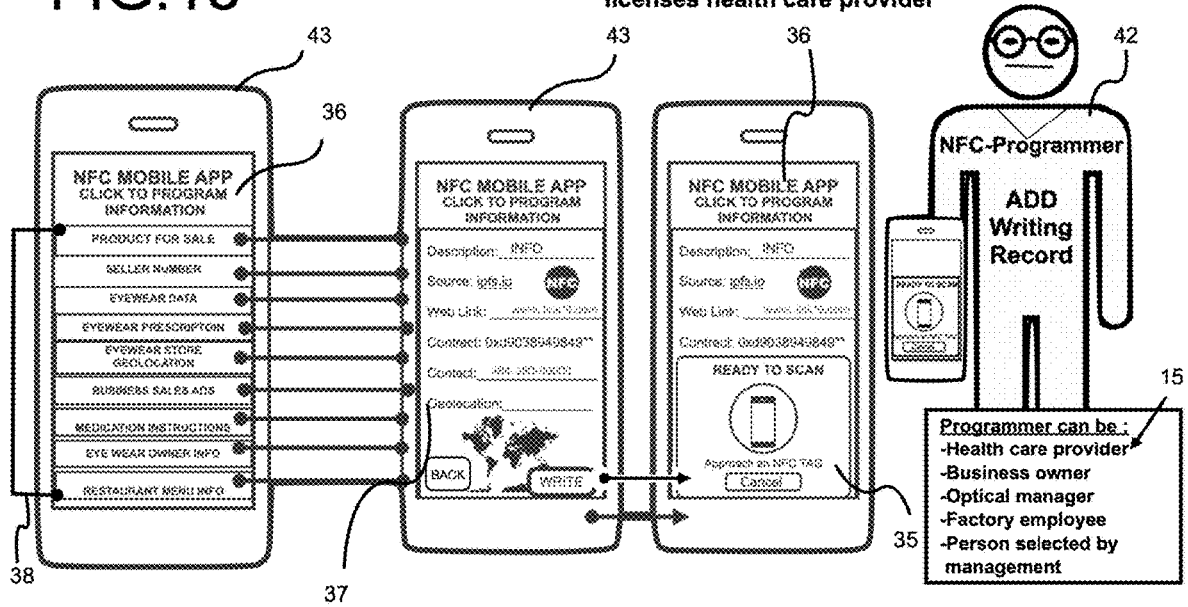
FIG. 13 illustrates an embodiment of a person with a smartphone and mobile application designed to read and write information on an NFC tag or sticker.

Continuing on FIG. 13, it illustrates a pictorial representation of a programmer smartphone 43 and mobile application graphical user interface 36 programming options (GUI 36) designed to scan, program or write information (ready to scan 35) on an NFC 1 tag or sticker. The mobile application may include, for example, software for recording web link content, software for linking an (internet protocol URL link) 53 browser with capabilities, video audio call capabilities, and software for network communications. The programmers 42 can add links to the designated NFT tags 1 that are embedded or adapted to products 33. The programmer 42 can be a person in a factory, business, health care provider 15 office, pharmacy, or optical chain. All spectacle, contact lenses, or medication prescriptions have to be verified or programmed by a licensed health care provider 15 (optometrist or ophthalmologist) 15.

Figure 14:
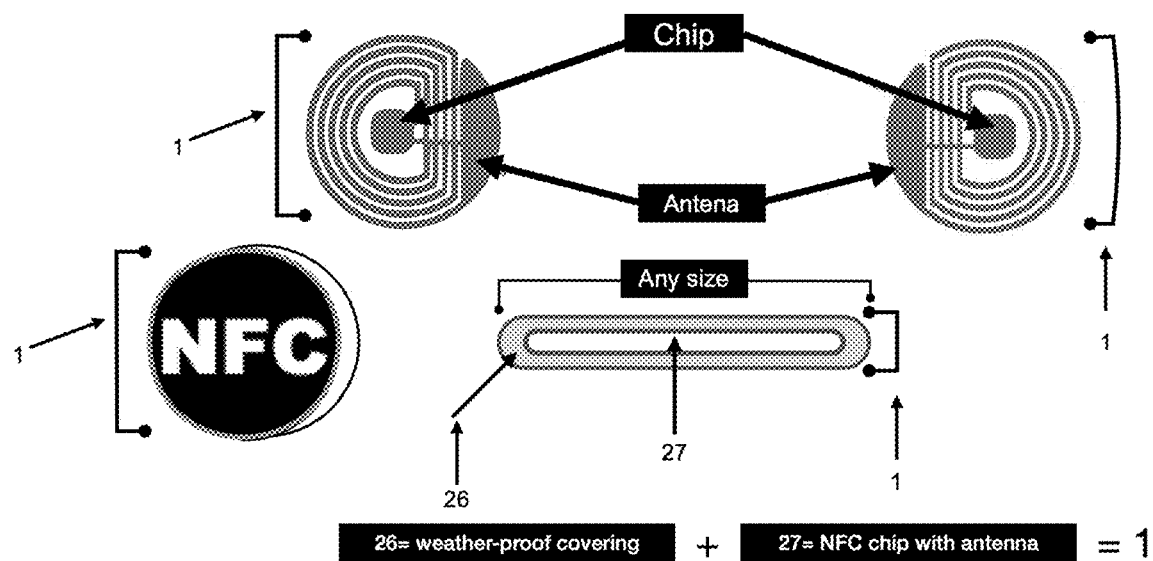
FIG. 14 illustrates an embodiment of an NFC tag or sticker that can be used to embed or adapt to the particular list of products information signs, stickers, eyewear frames, eyewear cases, contact lens cases, eyedrops medication containers, and eyewear accessories. The NFC tags or stickers are covered with a weatherproof material covering to protect the chip and antenna from external damage.

Continuing on FIG. 14 illustrates a pictorial representation of an NFC 1 tag or sticker. NFC tags 1, for example tag or stickers 24, contain small microchips 27 with little antennas 27 which can store a small amount of information for transfer to another NFC 1 device, such as a smartphone portable device. The NFC tags 1 or stickers 24 used can be any type and size in the market. The use of these NFC tags 1 or stickers 24 will be too embed or adapt to the particular products 33 such as information signs 10, bumper stickers 24, eyewear frames, eyewear cases, contact lens cases, and eyewear accessories 4. The NFC tags 1 or stickers 24 are covered with a weatherproof 26 material covering to protect the chip 27 and antenna 27 from external damage.

Figure 15:
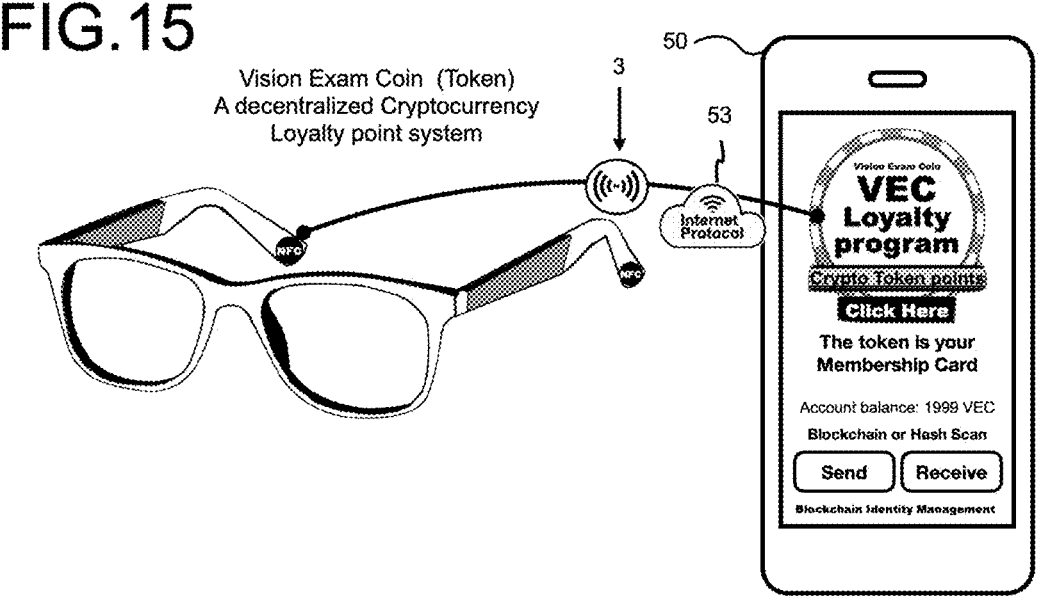
FIG. 15 illustrates an embodiment of a set of eyewear, sunglasses, or eyeglasses frames. Where they have embedded and/or adapted Near field communication tags onto its parts. At least one of the NFC tags can be programmed to particular information links.

Continuing on FIG. 15, it illustrates a pictorial representation of a set of eyewear, sunglasses, or eyeglasses frames. Where they have embedded and/or adapted near field communication tags onto its parts. Each NFC 1 tag can be programmed to particular information. The NFC tags 1 can be one or more embedded or adapted to eyewear frames, with each displaying at least one programmed information to them. The NFC 1 tag can be embedded or adapted to any part of the eyewear frame, such as spectacle frame parts, temples 51, legs nose pads 66, frame rim 64, frame bridge 65, frame tip 67, frame lens and/or spectacle retainers earpieces.

Figure 16:
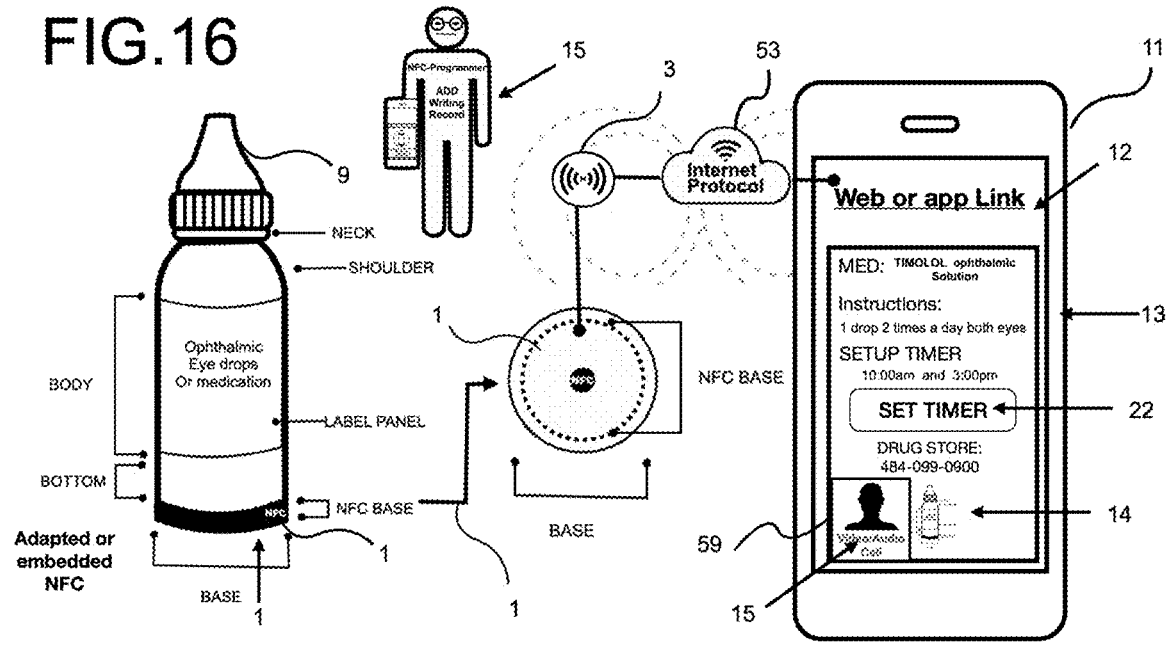
FIG. 16 illustrates an embodiment of at least one medication and/or eyedrops container. Where the container has embedded and/or adapted Near field communication tags onto its parts. At least one of the NFC tags can be programmed to particular information web links or mobile applications. Where the programmed information can forward a user smartphone portable device to set up a timer app, medical appointment scheduling link, video/audio telemedicine call, instruction of the use of medication link, drugstore phone number, mobile app and/or product image.

On FIG. 16, it illustrates a pictorial representation of a set of medication container 9 (eyedrops medications) 9. Where the medication container 9 have embedded and/or adapted near field communication tags 1 onto its parts. The NFC 1 tag can be programmed to particular information (FIG. 16; 13, 22, 14, 15). Where the information programmed can be medication instruction information (13), mobile app set up timer 22, image of medication 14, and/or eye doctor telemedicine video audio connection 59 (FIG. 16; 12, 13, 22, 59, 15, 14, 53). Where the NFC 1 tag or sticker can be programed by a health care provider 15.

Where the eye drop container 9 can be a prescription medication or over the counter eye drop medication 9. Where the eyedrops medication container 9 has an embedded or adapted NFC 1 tag or sticker placed by factory or health care provider. The placement of the NFC 1 device can be on the side, top, or bottom of the bottle. Where the NFC 1 tag can be programmed to have medication information, dosage, timer 22 setup, health care provider 15 scheduling link, and/or medication use information (FIG. 16; 14, 12, 22, 15, 59).

In all of these examples' embodiment, we can examine how we can use the list of products 33 and specific parts to deliver a synergistic product marketing 12 and services connections to users 40. Similar to legos where they provide different blocks that give us the capability to design anything. The combination of using NFC tags 1 in these particular products 33 and what information needs to be programmed can create a plurality of marketing 12 tactics and help patients or customers get the desired service in an easily accessible way. This provides needed patients or customers with information by just using their smartphones and tapping 3 the product.

What is claimed is:

1. A method for delivering verified user-specific data using a wearable programmable eyewear accessory apparatus removably attachable to a traditional eyewear frame, the method comprising:
 attaching an NFC apparatus to at least one external structural component of the eyewear frame using an attachment mechanism comprising:
  a weatherproof housing formed from a non-conductive material, wherein the housing serves as an attachment mechanism configured to fit onto the external structural element of the eyewear frame, wherein the attachment mechanism's three-dimensional design maintains a predetermined minimum spacing in the range of 2 to about 10 millimeters between the antenna assembly and any conductive frame element, thereby reducing electromagnetic interference and enabling improved NFC communication performance, including the potential for an increased effective communication range, as a function of the specific spacing configuration selected;
 programming said NFC apparatus with user-specific data using an external NFC processing device;
 retrieving data from the NFC apparatus using an external NFC processing device, wherein at least a portion of said data is obtained from at least one of: a centralized database, a decentralized data network, and a peer-to-peer distributing file system;
 verifying authenticity and integrity of at least a portion of the retrieved user-specific data;
 displaying the verified data on a graphical user interface associated with the external NFC processing device.

2. The method of claim 1, wherein programming said NFC apparatus, comprises:
 selecting at least one data packet to store on the NFC apparatus;
 storing at least one selected data packet on the NFC apparatus, wherein said data packet comprises at least one of: personal identification data, medical data, spectacle prescription details, appointment data, transaction data, digital assets, connectivity information, and customer service data; and
associating the stored data packet with a secure access by the external NFC processing device.

3. The method of claim 1, wherein programming the NFC apparatus, comprises:
 receiving, via an external NFC processing device, a selection from a plurality of selectable data types comprising at least one of: medical ophthalmic data, medical spectacle prescription data, and instruction of prescription;
 creating a data packet containing the selected data type;
 loading the data packet into the NFC apparatus,
 enabling NFC apparatus to transmit the loaded data to the external NFC processing device.

4. The method of claim 1, wherein retrieving data, comprises:
 enabling data retrieval user spectacle prescription medical data.

5. The method of claim, 1 wherein retrieving data, comprising:
 activating a mobile application associated with an external NFC processing device;
 initiating a communication protocol between the NFC apparatus coupled to a frame eyewear structure and an external NFC processing device, said communication protocol including at least one authentication step configured to verify the external NFC processing device against a store credential associated with the NFC apparatus;

transmitting a data access request from the external NFC processing device to the NFC apparatus to retrieve one or more user medical data;

authenticating the external NFC processing device by the NFC apparatus to ensure authorized access;

sending the requested data from the NFC apparatus to the external NFC processing device upon successful authentication; and verifying the receipt and integrity of the data at the external NFC processing device.

6. The method of claim 1, wherein programming the NFC apparatus, comprises:

storing marketing data onto the memory of the NFC apparatus, the NFC apparatus being wirelessly connected to a local external NFC processing device and one or more networks nodes; and retrieving data packet stored in the NFC apparatus and decentralized network using an external NFC processing device, wherein the data packet is accessed by at least one of: customer, user, patient and examinee.

7. The method of claim 1, wherein programming the NFC apparatus comprises:

establishing a communication channel between a mobile application executing on a mobile computing device and the NFC apparatus, wherein the NFC apparatus is configured to receive data wirelessly;

retrieving, by the mobile application, an image file from a decentralized storage network comprising a plurality of distributed nodes, wherein the image file is identified by a cryptographic content identifier and is accessible via an decentralized protocol;

obtaining, from a subset of the plurality of distributed nodes, a set of cryptographic proofs attesting to the authenticity of the retrieved image file, each cryptographic proof being independently verifiable and collectively ensuring that the image data has not been tampered with; and writing the verified image file into a secured memory region of the NFC apparatus, such that subsequent NFC read requests directed at the NFC apparatus produce the secure authenticated image data, thereby enabling a relying party to confirm the integrity of the provided image via a decentralized data storage system.

8. The method of claim 1, wherein programming said NFC apparatuss, comprises:

creating a data packet containing image content, wherein said image content comprises at least one of: a non-fungible token, a scanned document, eyeglass prescription data, contact lens prescription data, ophthalmic medical data, a decentralized data storage image, and a medical image;

connecting said data packet to at least one of: a centralized node and decentralized computing connection; and programming said data packet onto said NFC apparatus.

9. The method of claim 1, wherein programming said NFC apparatus comprises:

selecting aa modular wearable eyewear accessory design as the NFC apparatus to be coupled to at least a part of a framed eyewear structure;

attaching said NFC apparatus to said framed eyewear; and establishing communication between said enhanced framed eyewear structure with said attached NFC apparatus and an external NFC processing device for at least one of: programming and retrieval of data.

10. The method of claim 1, wherein retrieving stored data, comprising:

establishing an encrypted connection between said NFC apparatus and an authorized external NFC processing device using standard NFC protocol operations at 13.56 MHz;

authenticating the external NFC processing device using key infrastructure;

transmitting the data from a central server for medical data management and decentralized network node.

11. The method of claim 1, wherein retrieving data, comprises:

authenticating at least one type of medical data associated with the NFC apparatus and framed eyewear structure data; and displaying said communicated medical data on said graphical user interface of said external NFC processing device.

12. The method of claim 1, wherein retrieving data, comprises:

tapping the NFC apparatus using an external NFC processing device;

accessing data associated with at least one of: a centralized data base connection, peer to peer file system and decentralized networks; and verifying authenticity of the user via NFC processing device;

displaying said retrieved data on the interface of the external NFC processing device, wherein said data retrieval and display are performed regardless of the physical location of said NFC apparatus.

13. The method of claim 1, wherein retrieving data, comprises:

authenticating data packets onto said NFC apparatus associated with said frame eyewear;

verifying content said retrieved data packets on the graphical user interface of said external NFC processing device, wherein the data packets comprise at least one of: a URL, payment gateway, an image, prescription information including power, cylinder, axis, pupillary distance, prescription expiration date, materials, lenses used, lost and found data, and a reference to a medical database.

14. A method of claim 1, wherein retrieving data, comprises:

coupling said NFC apparatus to a frame eyewear temple structure at a predetermined distance to prevent electromagnetic interference; and retrieving said stored data from said NFC apparatus using said external NFC processing device.

15. The method of claim 1, wherein retrieving stored data, comprises:

authenticating said NFC apparatus with user related information comprising at least one of: a transaction unique identifier, smart contract data, marketing information, retail digital coupons, promotional content, medication instructions, prescription information, data logging parameters, communication protocols, usage guidelines, lost and found information, appointment scheduling links, telemedicine connection links, transaction hashes, medical data, authentication links, retail application links, URLs, e-commerce links, and multimedia content; and retrieving the programmed information from the NFC apparatus using said external NFC processing device.

16. A programmable near-field communication (NFC) frame eyewear accessory apparatus, comprising:
- an NFC adapter configured for removable attachment to a portion of an eyewear frame, said NFC adapter assembly including:
- a weatherproof housing attachment mechanism comprising:
- a semi-rigid enclosure formed from a water-resistant polymeric material, the enclosure including a conformal interior surface shaped to closely match and frictionally engage an exterior region of the eyewear frame without the use of permanent fasteners;
- at least one elastomeric gripping element integrated along the interior surface of the enclosure, to provide a non-slip interface between the enclosure and the eyewear frame under typical ambient temperatures and humidity levels, thereby ensuring stable retention during normal wear and activity; and
- a mechanical detent fit feature configured to allow secure, tool-free installation and removal of the enclosure from eyewear frames of varying cross-sectional geometries and thicknesses;
- an NFC identification tag fully encapsulated within the housing and positioned at a predefined spatial orientation relative to the eyewear frame such that:
- The NFC identification tag includes a secure memory module, and an integrated dual-antenna arranged enclosed within a weatherproof covering to execute a predefined authentication protocol before enabling transmission of stored digital data, thereby ensuring that data transfer occurs only upon successful verification of a recognized security credential;
- the antenna portion of the NFC identification tag is oriented at a distance with respect to the frame's longitudinal axis to minimize electromagnetic coupling interference caused by metallic frame elements; and
- a set of integrated layers in the interior of the enclosure adjacent the NFC tag's antenna coil, each shielding layer comprising a thin-film, low-conductivity polymer particle matrix arranged to prevent unintended signal attenuation, further ensuring secure data exchange with an external NFC processing device.

17. The apparatus of claim 16, wherein said housing attachment mechanism, is designed to mimic at least one of; a frame temple, earpiece, front frame, pads, hinges, end piece, silicone accessory, lens mount, decorative elements, temple tip, a decorative accessory.

18. The removably attachable NFC apparatus of claim 16, wherein a housing attachment mechanism is designed from a silicone polymer to be coupled to at least one of: a framed eyewear case, an Frame eyeglass holder, a temple tip, and a framed eyewear ear holder.

19. The apparatus of claim 16, wherein the (NFC) frame eyewear accessory apparatus is designed to:
- enhance a traditional framed eyewear with comfort and NFC capabilities via said eyewear accessory device structure; and
- enable said traditional framed eyewear to receive and send instruction to and from an external NFC processing device.

20. The apparatus of claim 16, wherein said NFC accessory apparatus is configured to conduct secure financial transaction.

* * * * *